US010719244B2

(12) United States Patent
Carson et al.

(10) Patent No.: US 10,719,244 B2
(45) Date of Patent: Jul. 21, 2020

(54) MULTI-MODE DATA REPLICATION FOR DATA LOSS RISK REDUCTION

(71) Applicant: INTERNATIONAL BUSINESS MACHINES CORPORATION, Armonk, NY (US)

(72) Inventors: Matthew D. Carson, Pasadena, CA (US); Joshua J. Crawford, Tucson, AZ (US); David Fei, Tucson, AZ (US); Larry Juarez, Tucson, AZ (US); Jay T. Kirch, Tucson, AZ (US); Sean P. Riley, Tucson, AZ (US); Todd C. Sorenson, Tucson, AZ (US); Maoyun Tang, Chandler, AZ (US); Matthew J. Ward, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 273 days.

(21) Appl. No.: 15/356,459

(22) Filed: Nov. 18, 2016

(65) Prior Publication Data
US 2018/0143774 A1 May 24, 2018

(51) Int. Cl.
G06F 11/00 (2006.01)
G06F 3/06 (2006.01)
G06F 11/30 (2006.01)

(52) U.S. Cl.
CPC ............ G06F 3/0619 (2013.01); G06F 3/065 (2013.01); G06F 3/067 (2013.01); G06F 3/0634 (2013.01);
(Continued)

(58) Field of Classification Search
CPC ............ G06F 11/0754; G06F 11/0757; G06F 11/076; G06F 11/2074; G06F 11/2076
See application file for complete search history.

(56) References Cited

U.S. PATENT DOCUMENTS 6,324,654 B1 11/2001 Wahl et al.
7,219,103 B2 * 5/2007 Vasudevan ........ G06F 17/30575
707/613
(Continued)

OTHER PUBLICATIONS

IBM Corporation, "Automatically Morphing Copy Rules through Policy and Environment", IP.com, IP.com No. IPCOM000182909D, May 8, 2009, pp. 2.
(Continued)

Primary Examiner — Elmira Mehrmanesh
(74) Attorney, Agent, or Firm — William K. Konrad; Konrad Raynes Davda & Victor

(57) ABSTRACT

Event detection logic detects events which may be associated with a change in risk of potential data loss in a data replication system. Mode selection logic is responsive to detection of such an event to select a data replication mode such as a synchronous data replication mode, for example, as a function of a detected event for initiation of a switch to the selected mode. In one embodiment, upon detecting that the event which lead to initiation of a switch to the synchronous mode has been completed or otherwise resolved, the mode selection logic can initiation of a switch of the data replication mode of multi-mode data replication logic back to an asynchronous mode so that data is replicated in the asynchronous data replication mode. Other features and aspects may be realized, depending upon the particular application.

24 Claims, 8 Drawing Sheets

(52) U.S. Cl.
CPC .......... *G06F 3/0653* (2013.01); *G06F 3/0673* (2013.01); *G06F 3/0683* (2013.01); *G06F 11/004* (2013.01); *G06F 11/3034* (2013.01); *G06F 11/3058* (2013.01); *G06F 2201/805* (2013.01); *G06F 2201/86* (2013.01); *G06F 2201/875* (2013.01)

(56) References Cited

U.S. PATENT DOCUMENTS

| | | | | |
|---|---|---|---|---|
| 7,613,749 | B2* | 11/2009 | Flynn, Jr. | G06F 11/1662 |
| 7,676,702 | B2* | 3/2010 | Basham | G06F 11/004 |
| | | | | 709/224 |
| 8,055,943 | B2* | 11/2011 | Edel | G06F 11/2064 |
| | | | | 707/648 |
| 8,341,115 | B1* | 12/2012 | Natanzon | G06F 11/1471 |
| | | | | 707/613 |
| 8,838,539 | B1* | 9/2014 | Ashcraft | H04L 67/02 |
| | | | | 707/637 |
| 8,843,783 | B2 | 9/2014 | Cox et al. | |
| 9,313,270 | B2 | 4/2016 | Joshi | |
| 9,507,844 | B2* | 11/2016 | Blea | G06F 17/30575 |
| 9,846,705 | B2* | 12/2017 | Chen | G06F 17/30215 |
| 2009/0313311 | A1* | 12/2009 | Hoffmann | G06F 11/2094 |
| 2011/0022879 | A1* | 1/2011 | Chavda | G06F 11/0793 |
| | | | | 714/1 |
| 2014/0032957 | A1* | 1/2014 | Beeston | G06F 11/2097 |
| | | | | 714/2 |
| 2014/0324774 | A1 | 10/2014 | Chen et al. | |
| 2015/0379107 | A1 | 12/2015 | Rank et al. | |

OTHER PUBLICATIONS

K.K. Ramakrishnan, et al., "Live Data Center Migration across WANs: A Robust Cooperative Context Aware Approach", ACM, Aug. 2007, pp. 6.

IBM Corporation, "Asynchronous PPRC solutions", [online][retrieved Oct. 14, 2016] https://www.ibm.com/support/knowledgecenter/SSLTBW_1.13.0/com.ibm.zos.r13.antg000/asyp . . . , pp. 3.

IBM Corporation, "Synchronous PPRC solutions", [online][retrieved Oct. 14, 2016] https://www.ibm.com/support/knowledgecenter/SSLTBW_1.13.0/com.ibm.zos.r13.antg000/basp . . . , pp. 3.

Wikipedia, "Peer to Peer Remote Copy", [online][retrieved Oct. 14, 2016] https://en.wikipedia.org/wiki/Peer_to_Peer_Remote_Copy, pp. 2.

* cited by examiner

MULTI-MODE DATA REPLICATION FOR DATA LOSS RISK REDUCTION

BACKGROUND OF THE INVENTION

1. Field of the Invention

The present invention relates to a computer program product, system, and method for multi-mode data replication for data loss risk reduction.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Thus, data from a host to be stored in the data storage system is typically directed to a primary system at a local site and then replicated to secondary system which may be geographically remote system from the primary system.

The process of replicating, that is, copying data over to the secondary system can be setup in either a synchronous or asynchronous relationship between the primary system and the secondary system. In a synchronous relationship, any updates to the primary system are typically synchronized with the secondary system, that is, successfully copied over to the secondary system, before the primary system reports to the host that the data storage input/output operation has been successfully completed. As a result, data storage to a primary storage system and a secondary system in a synchronous relationship may adversely affect system performance of the host while the host awaits completion of the synchronous copy operations. In storage systems in which the primary and secondary systems are widely separated, delays to completion of the synchronous copy operations may be greater, which can further adversely affect host performance. For example, in storage systems in which the primary system and the secondary system are separated by a geographical distance of 300 kilometers (Km) or more, for example, there can be a delay of 3-5 seconds (or more) before the data is successfully replicated at the secondary system.

As a result, storage systems frequently employ an asynchronous relationship between a primary system and a secondary system, particularly if the secondary system is geographically distant from the primary system. In an asynchronous relationship, successful updates to the primary system are typically reported to the host as a successful storage input/output operation without waiting for the update to be replicated to the secondary system. As a result, the host need not wait for the data replication to the secondary system to be completed, and the performance of the host system may be enhanced accordingly.

As the name suggests, in an asynchronous relationship, the primary system and the secondary system may not be fully synchronized at any one time. Thus, data stored on the secondary system typically lags that stored in the primary system. Accordingly, new data stored on a primary system may not be stored on the secondary system for an interval of time such as 3-5 seconds, for example.

In data replication systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices.

To maintain a degree of consistency of data across multiple volumes at a secondary system, the IBM® Total Storage disk subsystem Peer-to-Peer Remote Copy (PPRC) function supports the concept of a PPRC consistency group. Volumes in a PPRC relationship that are configured into a PPRC Consistency Group are maintained to ensure that a group of updates made to volumes at the primary system are also eventually made on the volumes at the secondary system to maintain data consistency for those volumes of the group. Accordingly, consistency groups may be formed between volumes of the primary system and the secondary system which are consistent with respect to a particular set of updates or a particular point in time, notwithstanding the overall asynchronous relationship between the primary system and the secondary system.

Tivoli Productivity Center for Replication is an example of an application that customers may use to manage planned and unplanned outages. The Tivoli Productivity Center for Replication application can detect failures at the primary storage system which may be at a local site, for example. Such failures may include a problem writing or accessing primary storage volumes at the local site. When the Tivoli Productivity Center for Replication recovery application detects that a failure has occurred, it can invoke a multi-storage volume swapping function, an example of which is the IBM HyperSwap® function. This function may be used to automatically swap processing for all volumes in a mirrored configuration from the local site to the remote site. As a consequence of the swap, the storage volumes at the remote site which were originally configured as the secondary volumes of the original copy relationship, are reconfigured as the primary volumes of a new copy relationship. Similarly, the storage volumes at the local site which were originally configured as the primary volumes of the original copy relationship, may be reconfigured as the secondary volumes of the new copy relationship, once the volumes at the local site are operational again.

SUMMARY

One general aspect of multi-mode data replication for data loss risk reduction in accordance with the present description, includes replicating data in a storage controller in a selected one of a plurality of data replication modes by a multi-mode data replication logic, and detecting a system component event associated with a change in risk of potential data loss due to a change in status of a component of the system. In response, a data replication mode may be selected as a function of a detected system component event. It is appreciated that one data replication mode may have a greater risk of data loss under some circumstances than another.

In one embodiment, in response to identification of the current data replication mode, if the current data replication mode is identified as other than the selected data replication mode, a switch of the data replication mode of the multi-mode data replication logic to the selected mode is initiated so that the multi-mode data replication logic replicates data in the selected data replication mode if the switch of the multi-mode data replication logic to the selected mode is successful. Thus, one embodiment includes detecting whether the switch of the multi-mode data replication logic to the selected mode is successful. Conversely, if the current data replication mode is identified as already being the selected data replication mode, the multi-mode data replication logic may maintain the current data replication mode. Other embodiments include corresponding computer systems, apparatus, and computer programs recorded on one or more computer storage devices, each configured to perform the actions of the methods.

Implementations may include one or more of the following features. In one embodiment, a first data replication mode is an asynchronous data replication mode and a second data replication mode is a synchronous data replication mode. A consistency group may be generated in the asynchronous data replication mode.

In one embodiment, a system component event associated with a change in risk of potential data loss includes a loss of a primary power source component of the system to define a loss of primary power source event. In such embodiment, a loss of primary power source event may be detected, and in response to a loss of primary power source event detection, the synchronous data replication mode may be selected. If the current data replication mode is detected to be the asynchronous data replication mode, a switch of data replication mode of the multi-mode data replication logic to the selected synchronous data replication mode may be initiated so that the multi-mode data replication logic replicates data in the selected synchronous data replication mode.

In another aspect, a primary power source restoration event may be detected prior to expiration of an interval of backup time associated with a backup power source. In response to such a primary power source restoration event detection, the asynchronous data replication mode may again be selected. Thus, if a prior switch of the multi-mode data replication logic to a selected synchronous data replication mode is detected to have been successful, the data replication mode of the multi-mode data replication logic may be switched back to the asynchronous data replication mode so that the multi-mode data replication logic again replicates data in the asynchronous data replication mode. In addition, in one embodiment, the switch back to the asynchronous data replication mode may occur after a wait period. Conversely, if a switch of the multi-mode data replication logic to a selected synchronous data replication mode is detected to have been unsuccessful, the data replication mode of the multi-mode data replication logic may continue or resume in the asynchronous data replication mode so that the multi-mode data replication logic replicates data in the asynchronous data replication mode.

In yet another aspect, a primary power source restoration failure event in which primary power source was not restored prior to expiration of the interval of backup time associated with a backup power source, may be detected. In response to detection of a primary power source restoration failure event, and if a switch of the multi-mode data replication logic to a selected synchronous data replication mode was successful, the data replication mode of the multi-mode data replication logic may be maintained in the selected synchronous data replication mode so that the multi-mode data replication logic replicates data in the selected synchronous data replication mode in anticipation of other corrective action such as a swap of input/output (I/O) operations to a remote system, for example. Conversely, if a switch of the multi-mode data replication logic to a selected synchronous data replication mode was unsuccessful, data such as data supporting a consistency group may be stored prior to other corrective action such as a shutdown of the system following expiration of the interval of backup time.

In another aspect, a system component event associated with a change in risk of potential data loss may be an event associated with maintenance of a system component. Accordingly, a system component maintenance event may be detected and in response to detection of a system component maintenance event, the synchronous data replication mode may be selected. If the current data replication mode is detected to be the asynchronous data replication mode, a switch of the data replication mode of the multi-mode data replication logic to the selected synchronous data replication mode may be initiated so that the multi-mode data replication logic replicates data in the selected synchronous data replication mode if the switch of the multi-mode data replication logic to the selected synchronous data replication mode is successful.

In still another aspect, a successful maintenance event associated with successful maintenance of the system component may be detected. In response to detection of a successful maintenance event, a wait for an interval of wait time may be performed. Upon expiration of the interval of wait time, the data replication mode may be switched back to the asynchronous data replication mode so that the multi-mode data replication logic replicates data in the selected asynchronous data replication mode following successful maintenance of the system component. Conversely, in absence of detection of a successful maintenance event, the data replication mode of the multi-mode data replication logic may be maintained in the selected synchronous data replication mode so that the multi-mode data replication logic replicates data in the selected synchronous data replication mode in anticipation of other corrective action such as detection of a successful maintenance event, or a manual switch of the data replication mode of the multi-mode data replication logic to an asynchronous data replication mode, for example.

In yet another aspect, if the switch of the multi-mode data replication logic to the selected synchronous data replication mode is detected to have been unsuccessful, a system operator warning may be issued, indicating that the data replication mode switch failed.

Implementations of the described techniques may include hardware, a method or process, or computer software on a computer-accessible medium. Other features and aspects may be realized, depending upon the particular application.

DETAILED DESCRIPTION

Figure 1:
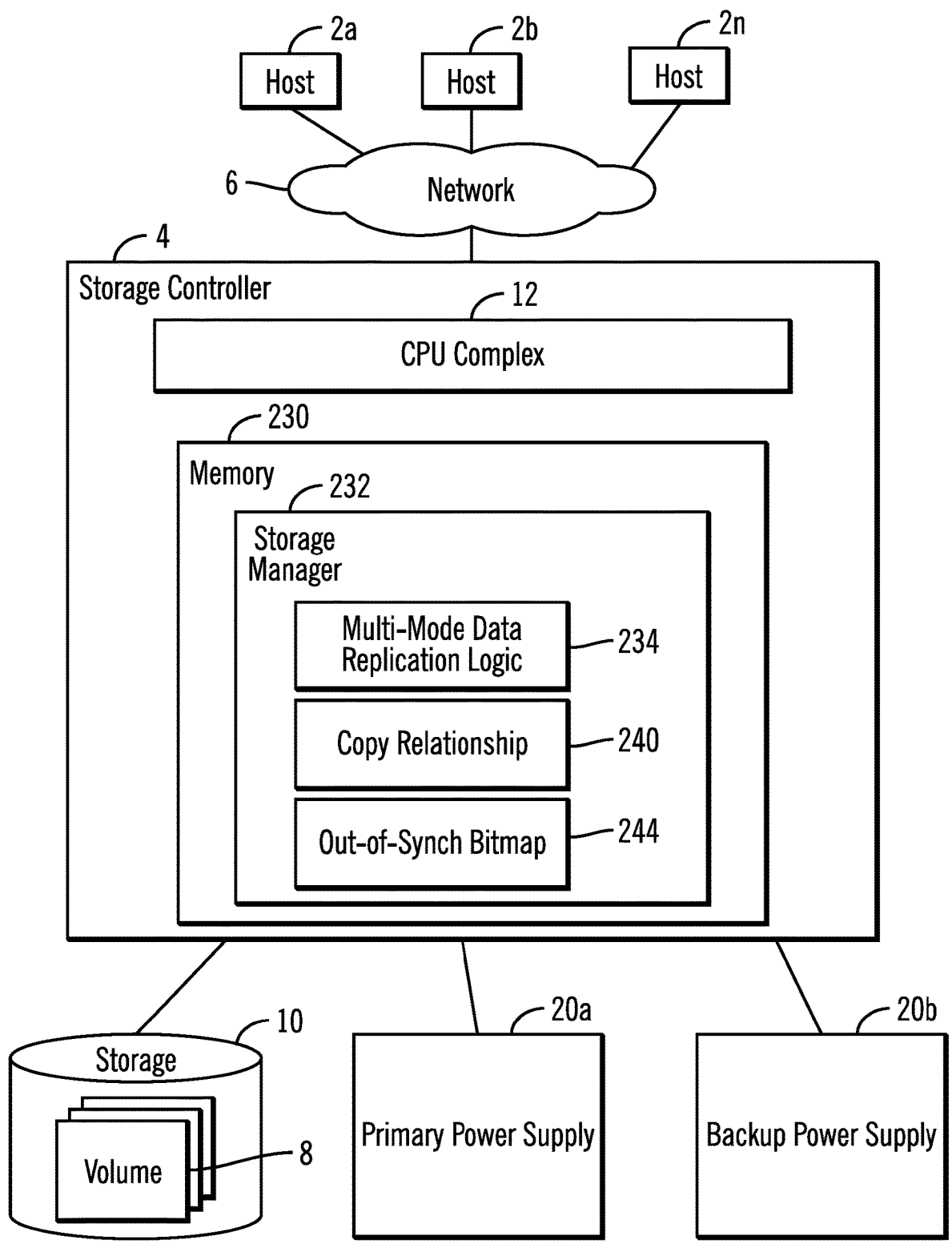
FIG. 1 illustrates an embodiment of a computing environment employing multi-mode data replication for data loss risk reduction in accordance with one aspect of the present description.

A system of one or more computers may be configured for multi-mode data replication for data loss risk reduction in accordance with the present description, by virtue of having software, firmware, hardware, or a combination of them installed on the system that in operation causes or cause the system to perform multi-mode data replication for data loss risk reduction operations. For example, one or more computer programs may be configured to perform multi-mode data replication for data loss risk reduction by virtue of including instructions that, when executed by data processing apparatus, cause the apparatus to perform the actions.

In accordance with one aspect of the present description, it is recognized that certain events associated with components of a data replication system may be associated with a change in risk of potential data loss in the system. For example, data storage systems frequently employ redundancy in system components such that if one system component fails, another redundant system component permits the data storage system to continue operating. However, should a maintenance operation be undertaken to repair or replace a system component, such a maintenance operation typically involves taking the particular system component offline. As a result, it is appreciated that maintenance of a system component may reduce the redundancy of system components, leading to an increased risk of data loss should another system component fail while a system component is offline.

As another example, a system component may go offline due to a failure or error within the component. Thus, a primary power source may fail due to a generated power outage. Many backup power sources rely upon batteries which may provide stored backup power for only a limited duration of time. Accordingly, it is recognized that a loss of a primary power source may lead to an increased risk of data loss should generated power not be restored before the stored backup power source fails.

It is further recognized that a particular mode of data replication in use may be associated with a higher degree of risk of potential data loss. For example, it is noted above that in asynchronous relationships between a primary and secondary system, there may be a delay on the order of 3-5 seconds, for example, in replicating a data update to the secondary system, particularly for data storage systems in which the secondary systems is relatively far geographically from the primary system. Thus, it is recognized herein that should loss of one or more system components cause a loss of data in the primary system, data which has not been successfully replicated to the secondary system of an asynchronous relationship may be lost.

In one aspect of the present description, event detection logic detects system component events which may be associated with a change in risk of potential data loss due to a change in status of a component of the system. As noted above, one example of such an event is a maintenance operation to repair or replace a system component. Another example, is an error in or a failure of a system component such as loss of a primary power source, for example. Thus, such events may be associated with an increased risk of data loss.

In one embodiment, mode selection logic is responsive to detection of a system component event to select a data replication mode as a function of a detected system component event. Such selection may in one embodiment be performed automatically by mode selection logic with little or no system operator participation. In this manner, the risk of data loss may be automatically reduced in many applications. For example, if the current data replication mode is an asynchronous data replication mode at the time an increased risk of loss event is detected, the mode selection logic initiates a switch of the data replication mode of a multi-mode data replication logic to a synchronous mode so that the multi-mode data replication logic replicates data in the synchronous data replication mode if the switch of the multi-mode data replication logic to the synchronous mode is successful.

It is recognized that switching to the synchronous data replication mode may adversely affect host system performance. However, it is appreciated herein that a reduction in host performance may be offset by an increase in system data integrity by temporarily switching to a synchronous data replication mode in the event that a system maintenance or an error or failure is detected that could otherwise increase the risk of data loss. For example, in a data storage operation transferring update data from a host to a data storage system operating in a synchronous data replication mode, should one or more failures in the data storage system cause a loss of update data in the data storage system before the update data is safely replicated to the secondary system, the failure of the update operation is typically reported by the data storage system to the host so that the host can preserve the update data that the host sent to the data storage system. In this manner, loss of data may be reduced in a data storage system operating in a synchronous data replication mode as compared to an asynchronous data replication mode.

By comparison, in a data storage operation transferring update data from a host to a data storage system operating in an asynchronous data replication mode, completion of the data storage operation is reported to the host once the data has been successfully transferred to the primary system. Should one or more failures in the data storage system cause a loss of update data in the data storage system before the update data is safely replicated to the secondary system, the host may have discarded the update date upon successful transfer of the data to the primary system. Accordingly, it is appreciated that there is an increased risk of data loss in an a data storage system operating in an asynchronous data replication mode as compared to an synchronous data replication mode.

In one embodiment, upon detecting that the system maintenance or other event which lead to the data replication mode switch to the synchronous mode has been completed or otherwise resolved, the mode selection logic can automatically switch the data replication mode of the multi-mode data replication logic back to the asynchronous mode so that the multi-mode data replication logic replicates data in the asynchronous data replication mode to restore host system performance to the pre-event level. Thus, events may be detected which are associated with a decreased risk of data loss. Examples of a decreased risk of loss event include successful completion of maintenance, repair or replacement of a system component. Thus, if the current data replication mode is a synchronous data replication mode at the time a decreased risk of loss event is detected, the mode selection logic can initiate a switch of the data replication mode of a multi-mode data replication logic back to an asynchronous mode so that the multi-mode data replication logic replicates data in the asynchronous data replication mode to restore host level system performance.

As noted above, a system of one or more computers may be configured for multi-mode data replication for data loss risk reduction in accordance with the present description, by virtue of having software, firmware, hardware, or a combination of them installed on the system that in operation causes or cause the system to perform multi-mode data replication for data loss risk reduction operations. Thus, the operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

In the illustrated embodiment, a copy relationship identifies a source storage location, such as a primary storage location, and a target storage location, such as a secondary storage location, in which data stored at the source storage location is to be replicated or otherwise copied to the target storage location. Thus, as used herein, a source storage location and a target storage location are storage locations related by a copy relationship.

Furthermore, as used herein, the term "storage unit" refers to a storage location containing one or more units of data storage such as one or more volumes, cylinders, tracks, segments, extents, or any portion thereof, or other unit or units of data suitable for transfer. Thus, a source storage unit and the associated target storage unit may each be a storage volume, wherein the volumes are typically at different devices or sites. However, it is appreciated that a source storage unit and a target storage unit may each be of a size other than a volume, for example.

Figure 2:
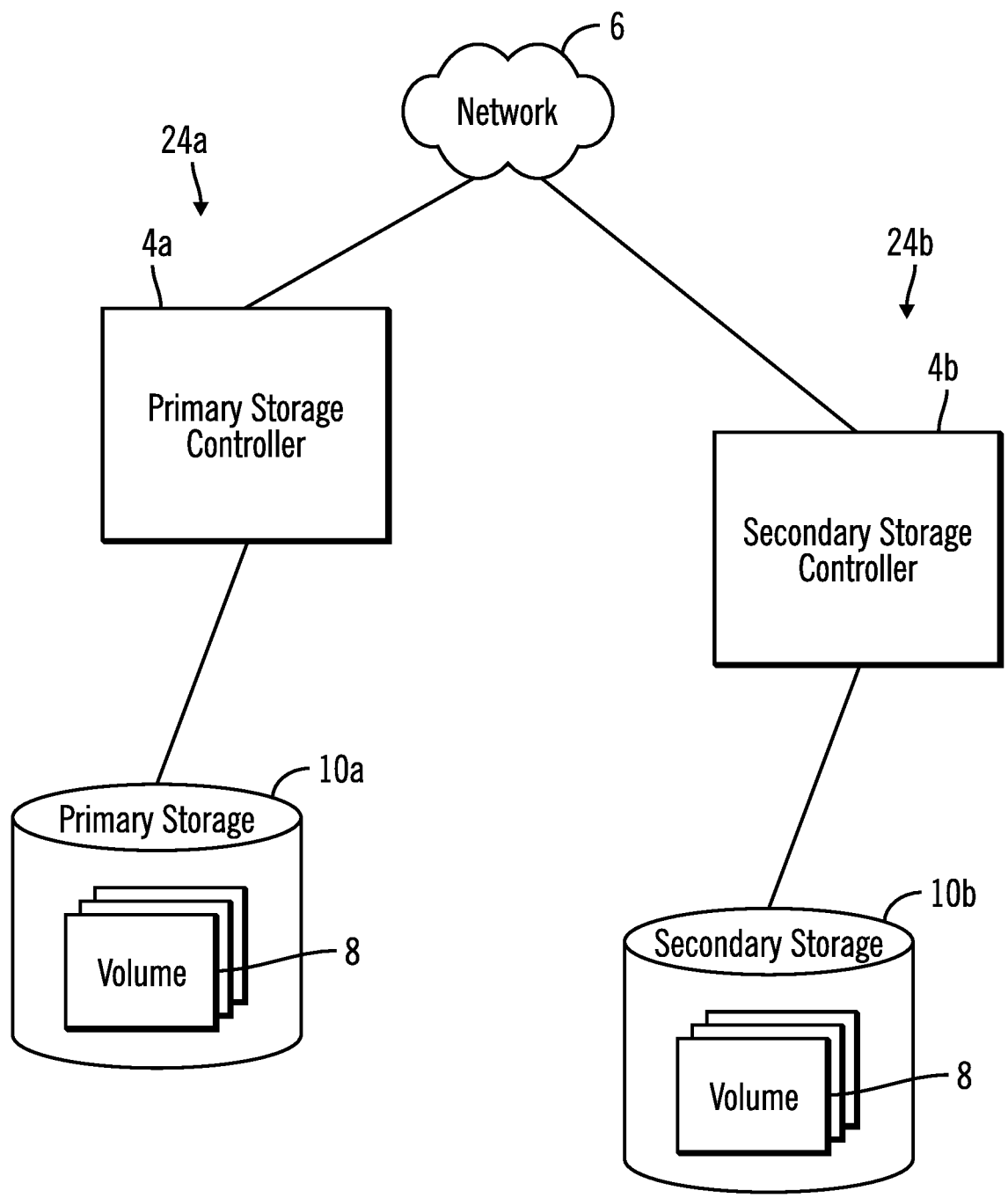
FIG. 2 illustrates an example of a storage system having a primary system and a secondary system employing multi-mode data replication for data loss risk reduction in accordance with one aspect of the present description.

Implementations of the described techniques may include hardware, a method or process, or computer software on a computer-accessible medium. FIG. 1 illustrates an embodiment of a computing environment employing multi-mode data replication for data loss risk reduction in accordance with the present description. A plurality of hosts 2a, 2b . . . 2n may submit Input/Output (I/O) requests to one or more storage controllers or storage control units 4, 4a (FIG. 2), 4b (FIG. 2) over a network 6 to access data at volumes 8 (e.g., Logical Unit Numbers, Logical Devices, Logical Subsystems, etc.) in storage represented by one or more storage drives 10, 10a, (FIG. 2), 10b (FIG. 2). Each storage controller 4, 4a, 4b includes a CPU complex 12 (FIG. 1), including one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

As used herein, a system component refers to any hardware or software component or subcomponent of the system of FIG. 1 including adapters, routers, switches, communication paths, controllers, storage devices, processors and their subcomponents. Thus, system components of the system of FIG. 1 includes a primary power supply 20a which receives alternating current power which has been generated by a power utility company or a power generator such as an on-site power generator, and supplies power in a form or forms suitable to the system. Thus, the primary power supply may modify the generated power received from the power utility company or a power generator in a manner appropriate for the system. Such modifications may include modifications to voltage, amperage, phase, alternating current (AC) to direct current (DC) conversion, etc, depending upon the particular application.

In the event that the primary power supply 20a fails, a backup power supply 20b may perform the aforementioned power supply operations to provide power to the system. It is appreciated that generated power from a utility company or a generator may fail and as such, the backup power supply 20b may include a battery power source which can provide stored power to the system for a limited duration of time before the batteries of the backup power supply 20b are exhausted. Typically, if generated power from a utility company or a generator is not restored within a particular interval of time, the storage controller initiates a shutdown procedure, saving data from local volatile memory by storing the data into nonvolatile storage before the batteries are exhausted to prevent loss of local data.

In the configuration illustrated in FIG. 2, the storage controller 4a and the data storage 10a have been configured as a primary storage control unit and the primary storage, respectively, of a primary system 24a. Similarly, the storage controller 4b and its data storage 10b have been configured as a secondary storage control unit and a secondary storage, respectively, of a secondary system 24b. Hence, in the configuration depicted in FIG. 2, the storage controller 4a will be referred to as a primary storage controller or control unit 4a, and the data storage 10a will be referred to as a primary storage 10a. Similarly, the storage controller or control unit 4b will be referred to as a secondary storage controller or control unit 4b and the data storage 10b will be referred to as a secondary data storage 10b.

In a particular copy relationship, the source unit is often referred to as the primary and the target unit is often referred to as the secondary. Replication relationships are defined between storage units of the data storage 10a and 10b. Notwithstanding a reference to the data storage 10a as "primary" and the data storage 10b as "secondary," particular storage units of the data storage 10a and the storage 10b may play both a primary (or source role) and a target (or secondary role) depending upon the particular copy relationship.

Figure 3:
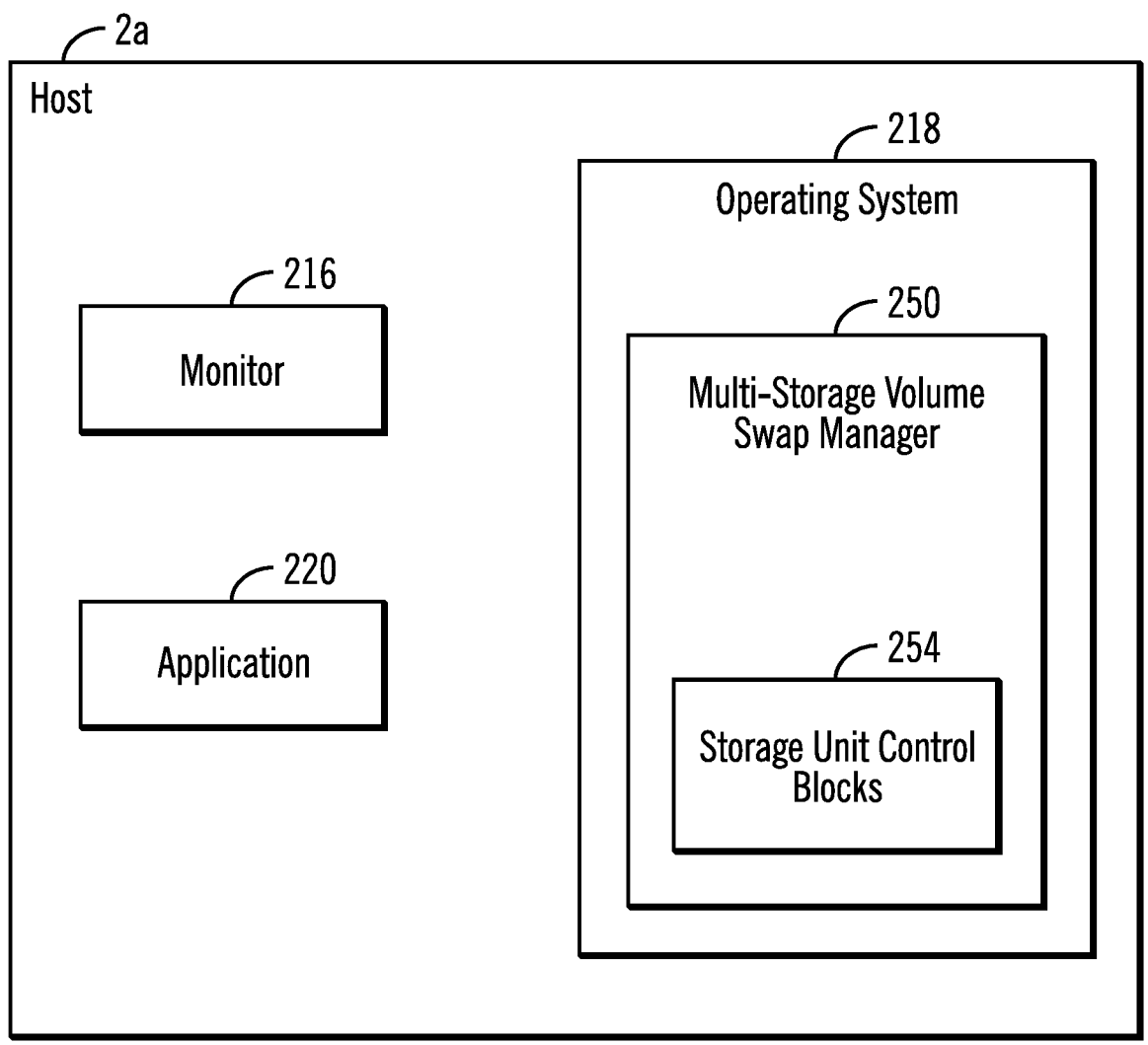
FIG. 3 illustrates an example of a host in the storage system of FIG. 1.

As noted above, the computing environment includes one or more hosts 2a, 2b, 2n (FIG. 1) writing updates to the primary storage controller 4a (FIG. 2) for storage in the primary storage 10a. At least one such host such as the host 2a, has in this embodiment, storage management functions including a monitor program 216 (FIG. 3) to monitor failures in the availability of the primary storage controller 4a (FIG. 2) and its associated data storage 10a. In some embodiments, the monitor program 216 may be operated in a device apart from the hosts.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 6.

A typical host as represented by the host 2a (FIG. 3) includes an operating system 218 and an application 220 that reads data from and writes updates via a storage controller 4a, 4b to the primary storage 10a or secondary storage 10b. A host which includes the monitor program 216 may omit update writing applications 220 in some embodiments.

The storage controllers 4 (FIG. 1), 4a (FIG. 2), 4b each have a memory 230 (FIG. 1) that includes a storage manager 232 for managing storage operations including data replication operations. A multi-mode data replication logic 234 of the storage manager 232 is configured to replicate data in a selected one of a plurality of data replication modes including a first data replication mode such as an asynchronous data replication mode, for example, and a second data replication mode such as a synchronous data replication mode, for example. In the asynchronous data replication mode, the multi-mode data replication logic 234 is further configured to generate a consistency group.

In the illustrated embodiment, the storage manager 232 including the multi-mode data replication logic 234, is depicted as software stored in the memory 230 and executed by the CPU complex 12. However, it is appreciated that the logic functions of the storage manager 232 may be implemented as hardware, software, firmware or combinations of one or more thereof, depending upon the particular application.

A copy relationship 240, which may be maintained by the multi-mode data replication logic 234 for the primary and secondary storage controllers 4a, 4b (FIG. 2) associates primary storage locations in the primary storage 10a and corresponding secondary storage locations in the secondary storage 10b, such that updates to the primary storage 10a locations are copied to the corresponding secondary storage 10b locations. For example, source storage locations in a storage volume 8 (FIG. 2) of storage 10a may be mirrored in a mirror data replication operation to target storage locations of a volume 8 of the storage 10b pursuant to the mirror copy relationship 240 (FIG. 1).

In the illustrated embodiment, copy relationship 240 comprises a peer-to-peer mirror relationship for a pair of storage locations in which updates to the primary (source) storage locations of the mirror relationship 240 are mirrored to the secondary (target) storage locations of the mirror relationship 240. It is appreciated that other types of copy relationships may be established, depending upon the particular application.

In connection with a copy relationship 240 in an asynchronous data replication mode of the multi-mode data replication logic 234, updates to the primary storage locations of the primary storage 10a are indicated in a bitmap, which is an out-of-sync (OOS) bitmap 244 in the illustrated embodiment. Bits of the OOS bitmap are cleared as the storage manager 232 copies updates indicated in the OOS bitmap to the corresponding storage locations of the secondary storage 10b of secondary storage control unit 4b.

The storage manager 232 accesses updates to the primary storage 10a to write to the corresponding storage locations in the storage 10b. In some applications, the copying and relationship functions may be performed by devices external to the storage systems 24a, 24b (FIG. 2), such as the hosts, for example. In the illustrated embodiment, the copying relationship 240 is a mirroring process in which each write update to the primary storage 10a is mirrored over to the secondary storage 10b. In the asynchronous mode of the illustrated embodiment, the I/O operation insofar as the host initiating the operation is concerned, is considered to be complete upon successful write of the update to the primary storage 10a. Accordingly, the host may be notified that the I/O operation was successfully completed notwithstanding that the update data has not yet been mirrored to the secondary storage 10b.

Periodically, volumes in a relationship 240 may be configured into a consistency group to ensure that a group of updates made to volumes at the primary system are also eventually made on the volumes at the secondary system to maintain data consistency as of a particular point in time or a particular set of data for those volumes of the group. Accordingly, additional updates to an OOS bit map may be stopped at a particular point in time to form a consistency group between volumes of the primary system and the secondary system. Any unprocessed updates as indicated by the OOS bit map are transferred to the secondary storage so that the volumes of the consistency group are consistent as of the point in time at which updates were no longer added to the OOS bit map.

In contrast to the asynchronous mode, in the synchronous mode of the multi-mode data replication logic 234, an I/O operation which performed a write operation to the primary storage 10a is not considered complete until the mirror operation is completed, that is, it is not complete until the update data has been successfully replicated to the secondary storage 10b. Should the mirror operation fail such that the update is not successfully mirrored to the storage 10b, the host may be notified that the update operation was not successfully completed. Accordingly, the host may preserve the write update data until the write update data is successfully stored on both the primary storage 10a and the secondary storage 10b.

The storage manager 232 in one embodiment may transfer data from the primary storage 10a to the secondary storage 10b in tracks. As used herein, the term track may refer to a track of a disk storage unit but may also reference to other units of data configured in the storage 10a, 10b, such as a bit, byte, word, segment, page, block (such as a Logical Block Address (LBA)), etc., which may be a part of a larger grouping of data units, such as a volume, logical device, etc.

In one embodiment, the storage devices 10a, 10b may be comprised of one or more sequential access storage devices, such as hard disk drives and magnetic tape or may include non-sequential access storage devices such as solid state drives (SSD), for example. Each storage device 10a, 10b may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

The monitor program 216 (FIG. 3) may monitor the primary storage controller 4a and upon detecting a failure event, may utilize a multi-storage volume swap manager 250 (FIG. 3) of the storage manager provided by an operating system 218 of a host 2a, to cause a failover operation to cause updates from the host to be sent to the secondary storage controller 4b (FIG. 2) instead of to the primary storage control unit 4a. In one embodiment, such volume swapping may be achieved by modifying appropriate data structures such as storage Unit Control Blocks (UCBs) 254 (FIG. 3) of the multi-storage volume swap manager 250. In the illustrated embodiment, the UCB's identify the storage locations in the primary and secondary storage subsystems, the status of such storage subsystem locations, and the network path to the particular storage locations of the storage subsystems. If the system fails while updates to the primary storage 10a are being applied to the storage 10b, then the updates that did not complete being mirrored to the storage 10b can be applied to the storage 10b if recoverable.

In the illustrated embodiment, the multi-storage volume swap manager 250 (FIG. 3) provides a multi-storage volume swap function such as the IBM HyperSwap® function. Although the multi-storage volume swap manager 250 is depicted as a part of the operating system 218 of one or more hosts 2a, 2b . . . 2n (FIG. 1) in the illustrated embodiment, it is appreciated that a multi-storage volume swap manager may be implemented in application software of a host, or in the operating system or application software of a storage control unit, for example, for storage management functions.

One mode of the multi-mode data replication logic 234 managing the copy relationships, may be implemented with synchronous copy operations, such as a peer-to-peer remote copy (PPRC) program modified as appropriate in accordance with present description. An example of a PPRC program is the IBM Tivoli Productivity Center for Replication copy program that enables the switching of updates from the primary storage 10a to the secondary storage 10b. Another mode of the multi-mode data replication logic 234 managing the copy relationships may be implemented with asynchronous remote copy operations, where updates to the primary storage 10a are mirrored to a corresponding location in a secondary storage 10b storage at a remote site. Suitable asynchronous mirroring programs include XRC (or zGM) modified as appropriate in accordance with present description. The described operations may be implemented with other programs such as other copy programs or other global recovery programs modified as appropriate in accordance with present description.

The system components 2a, 2b . . . 2n, 4, 4a, 4b, 10, 10a, 10b are connected to the network 6 which enables communication among these components. Thus, the network 6 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 2a, 2b, . . . 2n may be based upon a particular host attachment protocol such as FICON, for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

In the illustrated embodiment, system components include communication hardware associated with the communication paths between the nodes such as switches, routers, cables, modems, adapters, power supplies, etc. Communication software associated with the communication paths includes instructions and other software controlling communication protocols and the operation of the communication hardware in accordance with the communication protocols, if any. It is appreciated that other communication path protocols may be utilized, depending upon the particular application.

Figure 4:
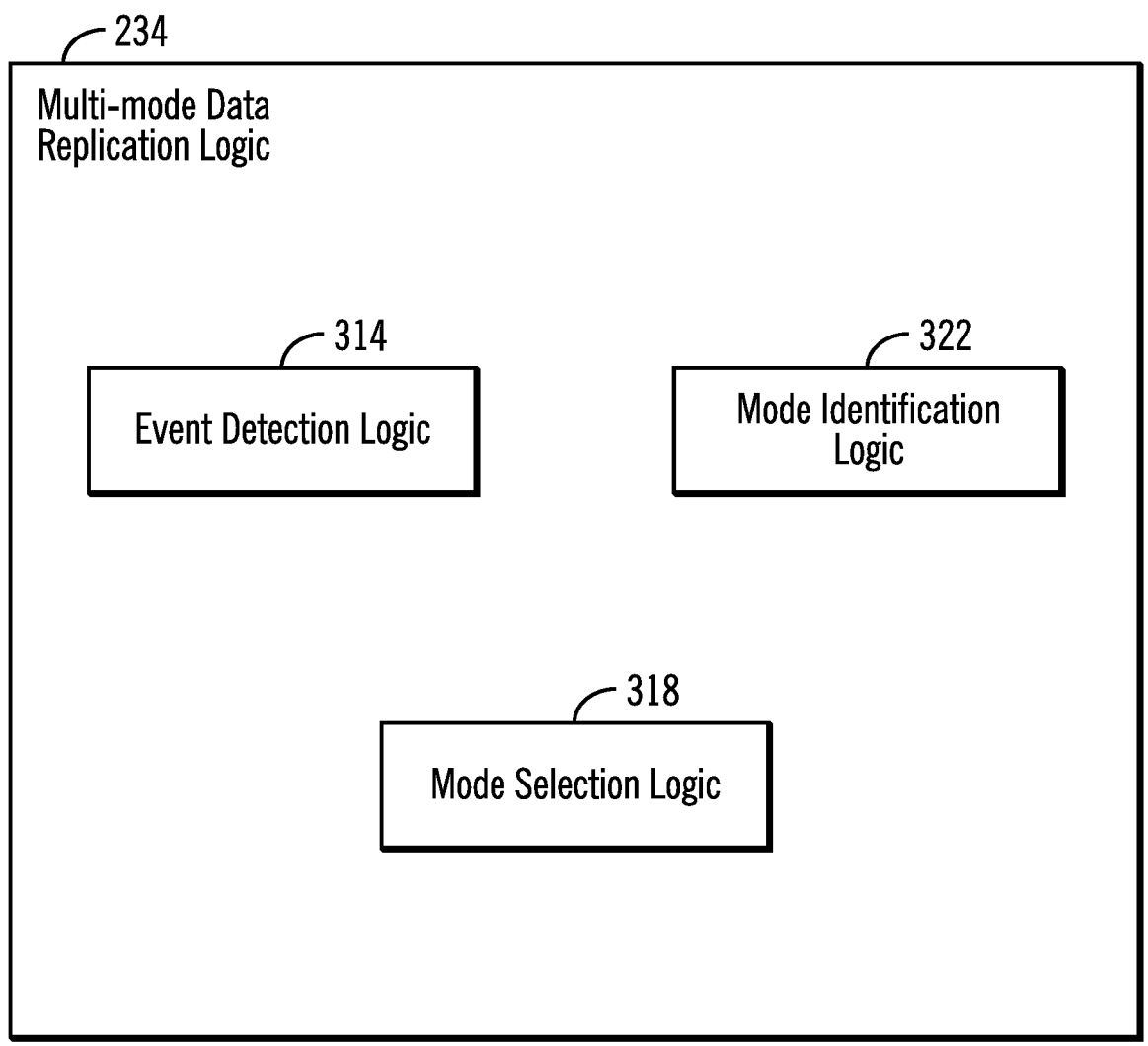
FIG. 4 illustrates an embodiment of multi-mode data replication logic configured for data loss risk reduction in accordance with one aspect of the present description.

FIG. 4 depicts one embodiment of multi-mode task dispatching logic 234 of the storage manager 232 (FIG. 1). The multi-mode data replication logic 234 of this embodiment is configured to replicate data in a selected one of a plurality of data replication modes including a first data replication mode such as an asynchronous data replication mode, and a second data replication mode such as a synchronous data replication mode. It is appreciated that some data replication modes such as an asynchronous data replication mode, for example, may have a greater risk of data loss under some circumstances, as compared to other data replication modes such as synchronous data replication mode, for example.

The multi-mode data replication logic 234 of this embodiment includes event detection logic 314 which is configured to detect a system component event associated with a change in risk of potential data loss due to a change in status of a component of the system. Examples of events which may be associated with an increase in risk of potential data loss include a system component going offline due to a failure or error within the component or due to a maintenance operation undertaken to repair or replace a system component. It is appreciated that a system component going offline may reduce the redundancy of system components, leading to an increased risk of data loss should another system component fail while a system component is offline.

Data replication mode selection logic 318 of the multi-mode data replication logic 234 is configured to be responsive to the event detection logic 314 to select a data replication mode as a function of a detected system component event. Mode identification logic 322 is configured to identify a current data replication mode of the multi-mode data replication logic 234. The data replication mode selection logic 318 is further configured to be responsive to mode identification logic 322, and if the current data replication mode is identified as being other than the selected data replication mode, to initiate a switch of the data replication mode of the multi-mode data replication logic 234 to the selected mode. In this manner, the multi-mode data replication logic 234 replicates data in the selected data replication mode if the switch of the multi-mode data replication logic 234 to the selected mode is successful. Conversely, if the current data replication mode as identified by the mode identification logic 322 is the selected data replication mode, the data replication mode selection logic 318 is further configured to maintain the multi-mode data replication logic 234 in the current data replication mode.

As noted above, system components of the system include a primary power source such as the primary power supply 20a (FIG. 1) and a backup power source such as the backup power supply 20b. In one embodiment, a system component event associated with a change in risk of potential data loss is a loss of the primary power source event. In this embodiment, the event detection logic 314 (FIG. 4) is further configured to detect a loss of the primary power source event and the data replication mode selection logic 318 is further configured to be responsive to a loss of the primary power source event as detected by event detection logic 314 to select a synchronous data replication mode. If the current data replication mode as identified by the mode identification logic 322 is the asynchronous data replication mode, a switch of data replication mode of the multi-mode data replication logic is initiated to the selected synchronous data replication mode. As a result, the multi-mode data replication logic 234 replicates data in the selected synchronous data replication mode if the switch of the multi-mode data replication logic to the selected synchronous data replication mode is successful.

Many backup power sources rely upon batteries which may provide stored backup power for only a limited duration of time. Accordingly, it is recognized that a loss of a primary power source may lead to an increased risk of data loss should generated power not be restored before the stored backup power source fails.

In one embodiment, a backup power source includes a backup battery power supply 20b (FIG. 1) which provides power limited to an associated interval of backup time. If generated power from a power utility or a generator is restored prior to expiration of the backup time interval, data replication operations may continue but may be switched back to the asynchronous mode. Conversely, if generated power from a power utility or a generator is not restored prior to expiration of the backup time interval, the local system 24a may interrupt data replication to save important local data and then shut down.

Accordingly, the event detection logic 314 is configured to detect a restoration of the primary power source, referred to herein as a restoration of the primary power source event, prior to expiration of the interval of backup time associated with the backup power source. The data replication mode selection logic 318 is configured to be responsive to a restoration of the primary power source event as detected by event detection logic 314 to select the asynchronous data replication mode, for continued data replication operations.

It is appreciated that a switch to a different data replication mode may not be successful due to various factors. For example, in a switch from an asynchronous data replication mode to a synchronous data replication mode, volumes in a copy relationship typically are brought to a fully synchronous state (often referred to as a full duplex mode) before the synchronous mode is fully operative. In such embodiment, if full duplex is not achieved, the switch to the synchronous mode may fail. Accordingly, in one embodiment, the mode identification logic 322 is further configured to detect whether the switch of the multi-mode data replication logic 234 to the selected mode has been successful. If a switch of the multi-mode data replication logic to a selected synchronous data replication mode was successful as detected by the mode identification logic 322, the multi-mode data replication logic 234 is configured to switch the data replication mode back to the selected asynchronous data replication mode so that the multi-mode data replication logic 234 again replicates data in the selected asynchronous data replication mode. Conversely, if a switch of the multi-mode data replication logic 234 to a selected synchronous data replication mode was unsuccessful as detected by the mode identification logic 322, the multi-mode data replication logic 234 is configured to continue or resume the data replication mode in the asynchronous data replication mode so that the multi-mode data replication logic 234 replicates data in the asynchronous data replication mode.

As noted above, generated power from a power utility or a generator may not be restored prior to expiration of the battery backup time interval. Accordingly, in one embodiment, the event detection logic 314 is configured to detect an event such as a failure of the primary power source to be restored event prior to expiration of the interval of backup time associated with the backup power source. Further, in one embodiment, the data replication mode selection logic 318 is further configured to be responsive to a failure of the primary power source to be restored event prior to expiration of the interval of time as detected by event detection logic 314 to maintain the data replication mode of the multi-mode data replication logic in the selected synchronous data replication mode, if a switch of the multi-mode data replication logic to a selected synchronous data replication mode is successful as detected by the mode identification logic. As a result, the multi-mode data replication logic replicates data in the selected synchronous data replication mode.

In one embodiment, replicating data in the selected synchronous data replication mode can facilitate a swap to the remote system so that the designations of the volumes of the secondary system at the remote site are swapped to a primary designation. As a result, due to loss of the primary power source and an expected exhaustion of the battery backup supply, host input/output operations may be redirected to volumes at the remote site which have been redesignated as the primary volumes instead of to volumes at the local site which were originally designated the primary volumes.

Conversely, if a switch of the multi-mode data replication logic 234 to a selected synchronous data replication mode was unsuccessful as detected by the mode identification logic 322, swapping I/O operations to the volumes at the remote site may not be appropriate in some embodiments since the volumes at the remote site have not been synchronized in a selected synchronous data replication mode. Accordingly, the multi-mode data replication logic 234 may be configured to store important local data such as data supporting a recent consistency group, in anticipation of an imminent shut down of the system following expiration of the backup interval of time.

As noted above, another example of a system component event associated with a change in risk of potential data loss is a system component event associated with system component maintenance such as repair or replacement of a system component. Accordingly, the event detection logic 314 is further configured to detect an event associated with maintenance of a system component, and the data replication mode selection logic 318 is further configured to be responsive to such a system component maintenance event as detected by event detection logic 314 to select the synchronous data replication mode. If the current data replication mode as identified by the mode identification logic 322 is the asynchronous data replication mode, the multi-mode data replication logic 234 initiates a switch of the data replication mode to the selected synchronous data replication mode. In this manner, the multi-mode data replication logic 234 replicates data in the selected synchronous data replication mode if the switch of the multi-mode data replication logic to the selected synchronous data replication mode is successful. In one embodiment, if the switch of the multi-mode data replication logic to the selected synchronous data replication mode was unsuccessful as detected by the mode identification logic 322, the multi-mode data replication logic 234 may be configured to issue a system operator warning that the data replication mode switch failed. Accordingly, the system operator may choose to discontinue the system component maintenance until a successful switch to the selected synchronous data replication mode is successful as detected by the mode identification logic 322.

In another aspect of the present description, the event detection logic 314 is further configured to detect whether the maintenance of the system component was successful, and the data replication mode selection logic 318 is further configured to be responsive to the mode identification logic 322 to maintain the data replication mode of the multi-mode data replication logic 234 in the selected synchronous data replication mode for an interval of time if the switch of the multi-mode data replication logic to the selected synchronous data replication mode was successful as detected by the mode identification logic 322. In this manner, the multi-mode data replication logic 234 replicates data in the selected synchronous data replication mode for an additional interval of time if the maintenance of the system component was successful and if the switch of the multi-mode data replication logic to the selected synchronous data replication mode was successful as detected by the mode identification logic 322.

Accordingly, in one embodiment, the data replication mode selection logic 318 is further configured to be responsive to the system component event detection logic to wait an interval of wait time if the maintenance of the system component was successful as detected by the event detection logic. Upon expiration of the interval of wait time, the data replication mode selection logic 318 is further configured to select the asynchronous data replication mode. In this manner, the multi-mode data replication logic 234 in the selected synchronous data replication mode is switched back to the asynchronous data replication mode so that the multi-mode data replication logic 234 again replicates data in the selected asynchronous data replication mode following successful maintenance of the system component and expiration of the interval of wait time.

Conversely, if the maintenance of the system component was unsuccessful as detected by the event detection logic 314, the data replication mode selection logic 318 is further configured to maintain the data replication mode of the multi-mode data replication logic 234 in the selected synchronous data replication mode. In this manner, the multi-mode data replication logic 234 may continue to replicate data in the selected synchronous data replication mode for an indefinite period of time if the maintenance of the system component was unsuccessful. However, in some applications, a system operator may manually switch the multi-mode data replication logic 234 back to the asynchronous data replication mode. Accordingly, in one embodiment, the multi-mode data replication logic 234 continues to replicate data in the selected synchronous data replication mode until either the maintenance of the system component was successful as detected by the event detection logic or a manual switch of the data replication mode of the multi-mode data replication logic 234 to an asynchronous data replication mode, is performed.

Figure 5:
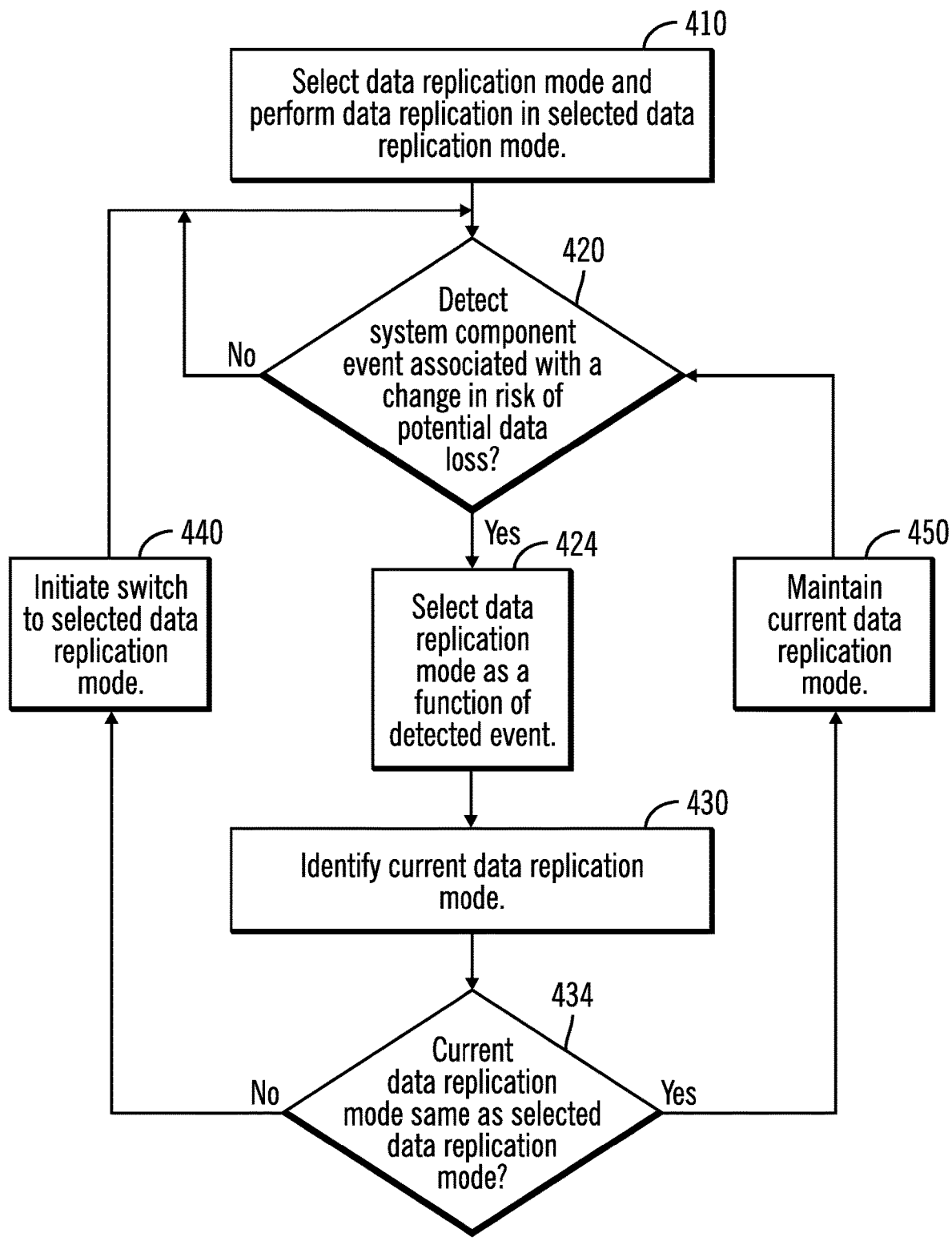
FIG. 5 depicts an example of operations of the multi-mode data replication logic of FIG. 3.

FIG. 5 depicts one embodiment of operations of the multi-mode data replication logic 234 (FIG. 4). Referring to both FIGS. 4 and 5 unless otherwise noted, the multi-mode data replication logic 234 of the storage manager 232 (FIG. 1) replicates data in a selected (block 410) data replication mode wherein the selectable modes include an asynchronous data replication mode, and a synchronous data replication mode. In this example, the secondary system 24*b* (FIG. 2) is sufficiently remote from the primary system 24*a* such that the asynchronous is usually selected (block 410) absent occurrence of system component events. However, it is appreciated that some data replication modes such as an asynchronous data replication mode, for example, may have a greater risk of data loss under some circumstances, as compared to other data replication modes such as synchronous data replication mode, for example.

Accordingly, a determination (block 420) is made as to whether the event detection logic 314 (FIG. 4) has detected a system component event associated with a change in risk of potential data loss due to a change in status of a component of the system. Examples of events which may be associated with an increase in risk of potential data loss include a system component going offline due to a failure or error within the component or due to a maintenance operation undertaken to repair or replace a system component. It is appreciated that a system component going offline may reduce the redundancy of system components, leading to an increased risk of data loss should another system component fail while a system component is offline. Should no system component event be detected (block 420), the multi-mode data replication logic 234 may continue to replicate data in the selected (block 410) data replication mode which is typically the asynchronous data replication mode in this example.

However, should a system component event be detected (block 420), the data replication mode selection logic 318 of the multi-mode data replication logic 234 selects (block 424) a data replication mode as a function of a detected system component event. In this example, upon detecting a system component event, the data replication mode selected is typically the synchronous data replication mode due to a potential increase in risk of data loss due to the system component event.

The mode identification logic 322 identifies (block 430) the current data replication mode of the multi-mode data replication logic 234. If the current data replication mode is identified as being other (block 434) than the selected data replication mode, the data replication mode selection logic 318 initiates (block 440) a switch of the current data replication mode of the multi-mode data replication logic 234 to the selected mode, which is typically selected to be the synchronous data replication mode. In this manner, the multi-mode data replication logic 234 replicates data in the selected data replication mode if the switch of the multi-mode data replication logic 234 to the selected mode is successful.

Conversely, if the current data replication mode as identified by the mode identification logic 322 is determined (block 434) to already be the selected data replication mode, the data replication mode selection logic 318 maintains (block 450) the multi-mode data replication logic 234 in the current data replication mode. Accordingly, the multi-mode data replication logic 234 continues to replicate data in the selected mode until another mode is selected such as a manual selection by a system operator, for example, or selection (block 424) as a function of a detected system component event.

As noted above, a primary power source may fail due to a power outage. Many backup power sources rely upon batteries which may provide backup power for only a limited duration of time. Accordingly, it is recognized that a loss of a primary power source may lead to an increased risk of data loss should power not be restored before the backup power source fails.

Figure 6:
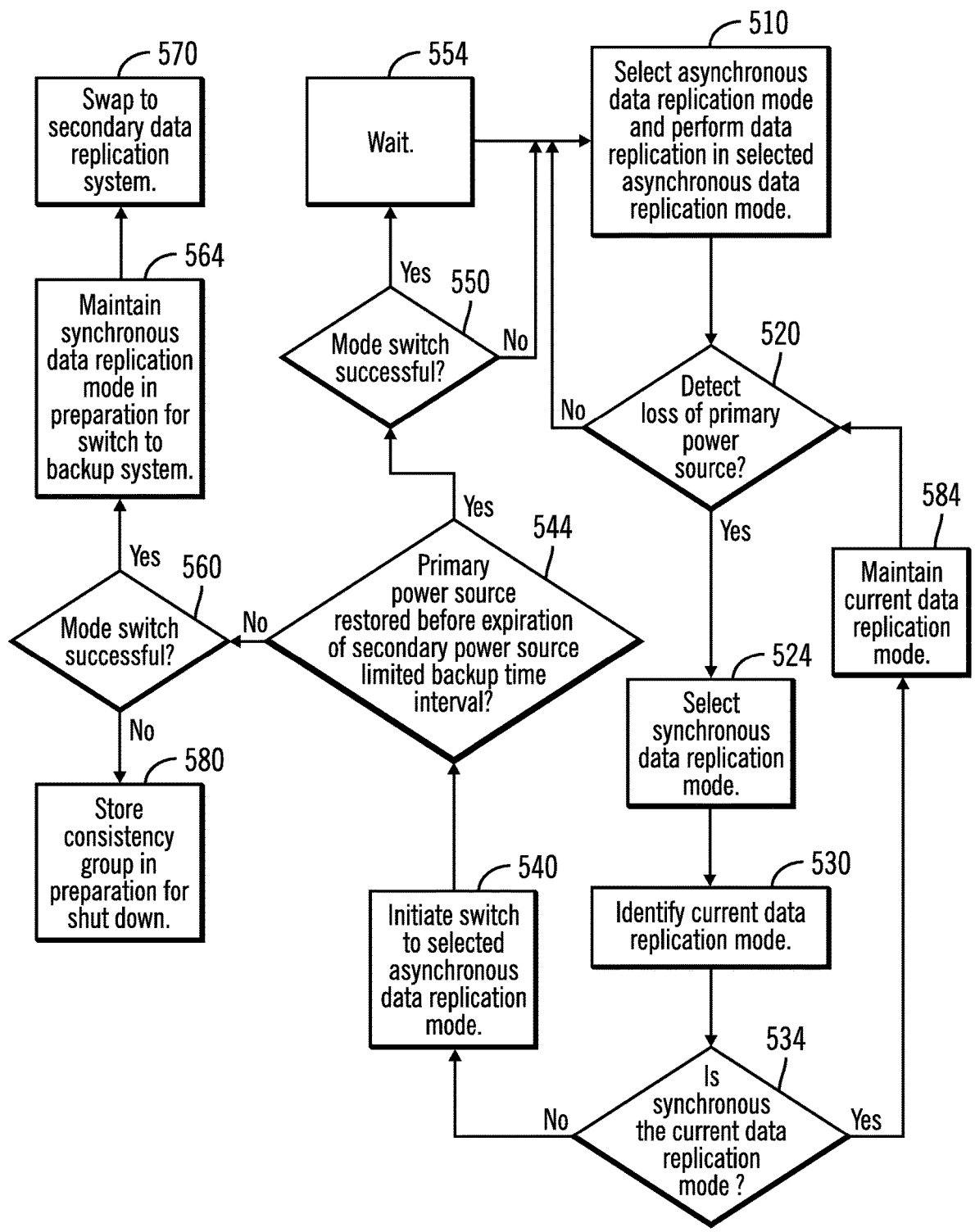
FIG. 6 depicts another example of operations of the multi-mode data replication logic of FIG. 3.

FIG. 6 depicts an example of operations of the multi-mode data replication logic 234 (FIG. 4) in the event that there is a power outage to the system which may be caused by failure of power generating components or power distribution components of a power utility company, or may be caused by failure of a local power generator, for example. Referring to both FIGS. 4 and 6 unless otherwise noted, the multi-mode data replication logic 234 of the storage manager 232 (FIG. 1) replicates data in a selected (block 510) data replication mode in a manner similar to that described above in connection with FIG. 5. Thus, in this example, the secondary system 24b (FIG. 2) is sufficiently remote from the primary system 24a such that the asynchronous mode is selected (block 410) absent occurrence of system component events.

As noted above, system components of the data replication system may include a primary power source such as the primary power supply 20a (FIG. 1) and a backup power source such as the backup power supply 20b which includes a battery-powered backup. In one embodiment, a system component event associated with a change in risk of potential data loss is a loss of the primary power source event due to power outage which causes the system to rely upon the batter-powered backup. In the example of FIG. 6, event detection logic 314 determines (block 520) whether a loss of the primary power source event has been detected. Should no primary power source loss event be detected (block 520), the multi-mode data replication logic 234 may continue to replicate data in the selected (block 510) data replication mode which is the asynchronous data replication mode in this example.

However, should a primary power source loss event be detected, the data replication mode selection logic 318 of the multi-mode data replication logic 234 selects (block 524) a data replication mode as a function of a detected system component event. In this example, upon detecting a primary power source loss event, the data replication mode selected is the synchronous data replication mode due to a potential increase in risk of data loss due to the primary power source loss event.

The mode identification logic 322 identifies (block 530) the current data replication mode of the multi-mode data replication logic 234. If the current data replication mode is identified as being other (block 534) than the selected data replication mode, the data replication mode selection logic 318 initiates (block 540) a switch of the current data replication mode of the multi-mode data replication logic 234 to the selected mode.

In this example, if the current data replication mode as identified (block 530) by the mode identification logic 322, is the asynchronous data replication mode, a switch of data replication mode of the multi-mode data replication logic is initiated (block 540) to the selected synchronous data replication mode. As a result, the multi-mode data replication logic 234 will replicate data in the selected synchronous data replication mode if the switch of the multi-mode data replication logic to the selected synchronous data replication mode is successful.

As noted above, many backup power sources rely upon batteries which may provide stored backup power for only a limited duration of time. Accordingly, it is recognized that a loss of a primary power source may lead to an increased risk of data loss should generated power not be restored before the battery-powered backup power source is exhausted or otherwise fails.

In one embodiment, a battery-powered backup power supply 20b (FIG. 1) provides power limited to an associated interval of backup time. If generated power from a power utility or a generator is restored prior to expiration of the limited backup time interval, data replication operations may continue and may be subsequently switched back to the asynchronous mode. Conversely, if generated power from a power utility or a generator is not restored prior to expiration of the backup time interval, the local primary system 24a (FIG. 2) may interrupt data replication to save important local data and then shut down.

Accordingly, in this example, the event detection logic 314 determines (544) whether it has detected a restoration of the primary power source, referred to herein as a primary power source restoration event, prior to expiration of the limited backup time interval of the battery-powered secondary power source. If so, the data replication mode selection logic 318 continues data replication. However, it is appreciated that a switch to a different data replication mode may not be successful due to various factors. Accordingly, in one embodiment, the mode identification logic 322 detects (block 550) whether the switch of the multi-mode data replication logic 234 to the selected synchronous mode has been successful.

If it is determined (block 550) that a switch of the multi-mode data replication logic to a selected synchronous data replication mode was successful as detected by the mode identification logic 322, the multi-mode data replication logic 234 waits (block 554) a predetermined interval before switching (block 510) the data replication mode back to the selected asynchronous data replication mode.

One example of a suitable wait interval before switching back to the asynchronous data replication mode is a wait of 10-30 minutes. It is believed that such a wait interval may facilitate a more smooth transition back to the asynchronous mode. For example, such a wait period may permit the data replication system to achieve full duplex before switching to the asynchronous mode. Moreover, restoration of generated power may be only temporary. Accordingly, a wait of 10-30 minutes may facilitate establishing that the generated power is stable. In this manner, upon restoration of the generated power, the multi-mode data replication logic 234 following the wait interval again replicates data in the selected asynchronous data replication mode. However, such a wait interval may be obviated in some embodiments.

Conversely, if it is determined (block 550) that the switch of the multi-mode data replication logic 234 to the selected synchronous data replication mode was unsuccessful as detected by the mode identification logic 322, the multi-mode data replication logic 234 continues the data replication mode in the asynchronous data replication mode since the generated power has been restored (block 544). As a result, data replication in the synchronous mode is bypassed since the switch (block 540) to the synchronous mode was not successful (block 550).

If the event detection logic 314 detects (block 544) expiration of the limited backup time interval of the battery-powered secondary power source before restoration of the primary power source, the mode identification logic 322 determines (block 560) whether the switch of the multi-mode data replication logic 234 to a selected synchronous data replication mode was successful. If so, the multi-mode data replication logic 234 continues (block 564) the data replication mode in the synchronous data replication mode in preparation for a swap (block 570) to the secondary system 24*b* (FIG. 2) since the generated power has been not been restored (block 544).

In one embodiment, replicating data in the selected synchronous data replication mode can facilitate a swap to the remote system so that the designations of the volumes of the secondary system at the remote site are swapped to a primary designation. For example, a swap of a secondary system to being redesignated as the primary system to receive I/O operations of a host is facilitated in many embodiments, since the volumes of the original secondary system are fully synchronized with the corresponding volumes of the copy relationship located at the original primary system. As a result, due to loss of the primary power source and an expected exhaustion of the battery backup supply, host input/output operations may be redirected by the swap to volumes at the remote site which have been redesignated as the primary volumes instead of to volumes at the local site which were originally designated the primary volumes.

In one embodiment, a swap function such as the IBM HyperSwap® function may be utilized, modified as appropriate in view of the present disclosure. It is appreciated that other swap functions may be utilized depending upon the particular application. Upon completion of the swap to the secondary system 24*b*, host input/output operations are directed to the secondary system 24*b* instead of to the primary system 24*a* such that the system 24*b* is redesignated the primary system.

Conversely, if a switch of the multi-mode data replication logic 234 to a selected synchronous data replication mode is determined (block 560) to have been unsuccessful as detected by the mode identification logic 322, swapping to the volumes at the remote site may not be appropriate in some embodiments since the volumes at the remote site have not been synchronized in a selected synchronous data replication mode. Accordingly, the multi-mode data replication logic 234 may store (block 580) important local data such as data supporting a recent consistency group, in non-volatile storage, in anticipation of an imminent shut down of the system following expiration of the limited backup time interval.

If the current data replication mode as identified by the mode identification logic 322 is determined (block 534) to already be the selected synchronous data replication mode, the data replication mode selection logic 318 maintains (block 584) the multi-mode data replication logic 234 in the current data replication mode. Accordingly, the multi-mode data replication logic 234 continues to replicate data in the selected synchronous mode until another mode is selected such as a manual selection by a system operator, for example.

As previously mentioned, a maintenance operation frequently involves taking one or more system components offline. As a result, it is appreciated that maintenance of a system component may reduce the redundancy of system components, leading to an increased risk of data loss should another system component fail while a system component is offline.

Figure 7:
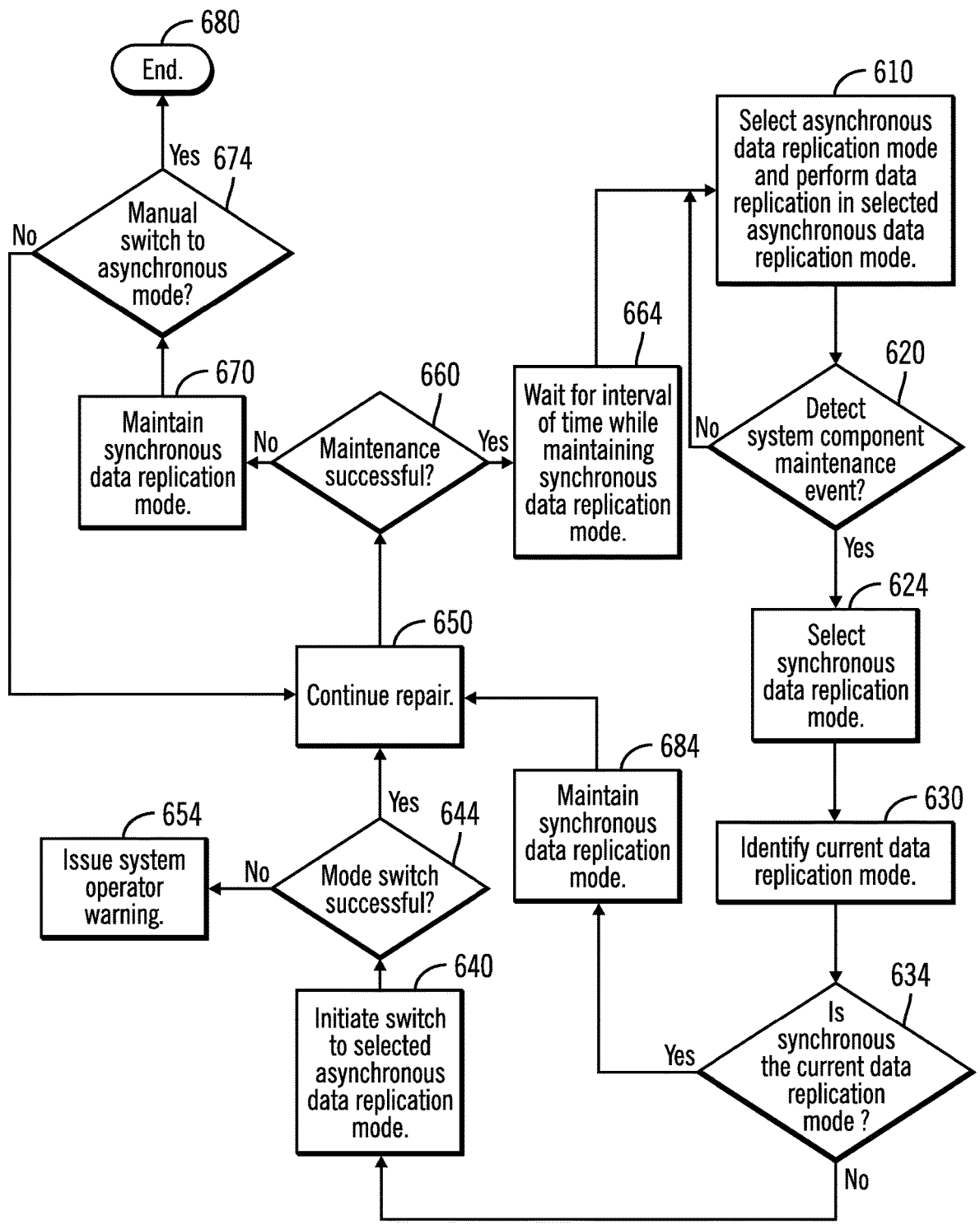
FIG. 7 depicts yet another example of operations of the multi-mode data replication logic of FIG. 3.

Accordingly, another example of a system component event associated with a change in risk of potential data loss is a system component event associated with system component maintenance such as repair of a system component. FIG. 7 depicts an example of operations of the multi-mode data replication logic 234 (FIG. 4) in an event associated with system component maintenance such as repair of a system component. Referring to both FIGS. 4 and 7 unless otherwise noted, the multi-mode data replication logic 234 of the storage manager 232 (FIG. 1) replicates data in a selected (block 610) data replication mode in a manner similar to that described above in connection with FIG. 5. Thus, in this example, the secondary system 24*b* (FIG. 2) is sufficiently remote from the primary system 24*a* such that the asynchronous is selected (block 610) absent occurrence of system component events.

In the example of FIG. 7, the event detection logic 314 determines (block 620) whether an event associated with maintenance of a system component has been detected. Should no system component maintenance event be detected (block 620), the multi-mode data replication logic 234 may continue to replicate data in the selected (block 610) data replication mode which is the asynchronous data replication mode in this example.

However, should a system component maintenance event be detected (block 620), the data replication mode selection logic 318 selects (block 624) a data replication mode as a function of the detected system component event. In this example, upon detecting a system component maintenance event, the data replication mode selected is the synchronous data replication mode due to a potential increase in risk of data loss resulting from the system component maintenance event.

The mode identification logic 322 identifies (block 630) the current data replication mode of the multi-mode data replication logic 234. If the current data replication mode is identified as being other than the selected data replication mode, the data replication mode selection logic 318 initiates (block 640) a switch of the current data replication mode of the multi-mode data replication logic 234 to the selected mode.

In this example, if the current data replication mode as identified (block 634) by the mode identification logic 322, is the asynchronous data replication mode, a switch of data replication mode of the multi-mode data replication logic is initiated (block 640) to the selected synchronous data replication mode. As a result, the multi-mode data replication logic 234 will replicate data in the selected synchronous data replication mode if the switch of the multi-mode data replication logic to the selected synchronous data replication mode is successful.

However, it is appreciated that a switch to a different data replication mode may not be successful due to various factors. Accordingly, in one embodiment, the mode identification logic 322 detects (block 644) whether the switch of the multi-mode data replication logic 234 to the selected synchronous mode has been successful. If it is determined (block 644) that a switch of the multi-mode data replication logic to a selected synchronous data replication mode was successful as detected by the mode identification logic 322, the system operator may continue (block 650) the maintenance of the system component with a reduced risk of data loss due to operation of the multi-mode data replication logic 234 in the synchronous data replication mode.

Conversely, if it is determined (block 644) that a switch of the multi-mode data replication logic to a selected synchronous data replication mode was not successful as detected by the mode identification logic 322, a warning may be issued (block 654) to the system operator. As a result of the warning to the system operator that the switch to the synchronous mode was not successful, the system operator may elect to terminate the system component maintenance operation until the multi-mode data replication logic 234 is successfully switched to the synchronous data replication mode either by a manual switch by the system operator the system operator or by an automatic switch (block 624) to the synchronous data replication mode.

As noted above, upon a determination (block 644) that a switch of the multi-mode data replication logic to a selected synchronous data replication mode was successful as detected by the mode identification logic 322, the system operator may continue (block 650) the maintenance of the system component with a reduced risk of data loss due to operation of the multi-mode data replication logic 234 in the synchronous data replication mode. If it is subsequently determined (block 660) that the maintenance of the system component was successful, the data replication mode selection logic 318 may wait (block 664) for an interval of time while maintaining the data replication mode of the multi-mode data replication logic 234 in the selected synchronous data replication mode, before selecting (block 610) the asynchronous data replication mode to return data replication to the asynchronous data replication mode.

As previously mentioned above in connection with the embodiment of FIG. 6, one example of a suitable wait interval before switching back to the asynchronous data replication mode is a wait of 10-30 minutes. It is believed that such a wait interval may facilitate a more smooth transition back to the asynchronous mode. For example, such a wait period may permit the data replication system to achieve full duplex before switching to the asynchronous mode. It is appreciated that other wait periods may be utilized, depending upon the particular application, including no wait periods.

In one embodiment, a system component remaining offline may provide an indication that the maintenance of the system component has not yet been successfully completed. Accordingly, if the maintenance of the system component is determined (block 660) to have not yet been successfully completed as detected by the event detection logic 314, the data replication mode selection logic 318 continues to maintain (block 670) the data replication mode of the multi-mode data replication logic 234 in the selected synchronous data replication mode while repairs or other maintenance continues (block 650). In this manner, the multi-mode data replication logic 234 may optionally continue (block 670) to replicate data in the selected synchronous data replication mode for an indefinite period of time if the maintenance of the system component was unsuccessful. However, in some applications, a system operator may manually switch (block 674) the multi-mode data replication logic 234 back to the asynchronous data replication mode, ending (block 680) mode switch operations associated with a detected system component event. Accordingly, in one embodiment, the multi-mode data replication logic 234 continues to replicate data in the selected synchronous data replication mode until either the maintenance of the system component was successful as detected by the event detection logic or a manual switch of the data replication mode of the multi-mode data replication logic 234 to an asynchronous data replication mode, is performed.

In this example, if the current data replication mode as identified (block 634) by the mode identification logic 322, is the synchronous data replication mode, no switch of data replication mode of the multi-mode data replication logic is initiated. Instead, the selected synchronous data replication mode is maintained (block 684) while repairs or other maintenance continues (block 650).

Figure 8:
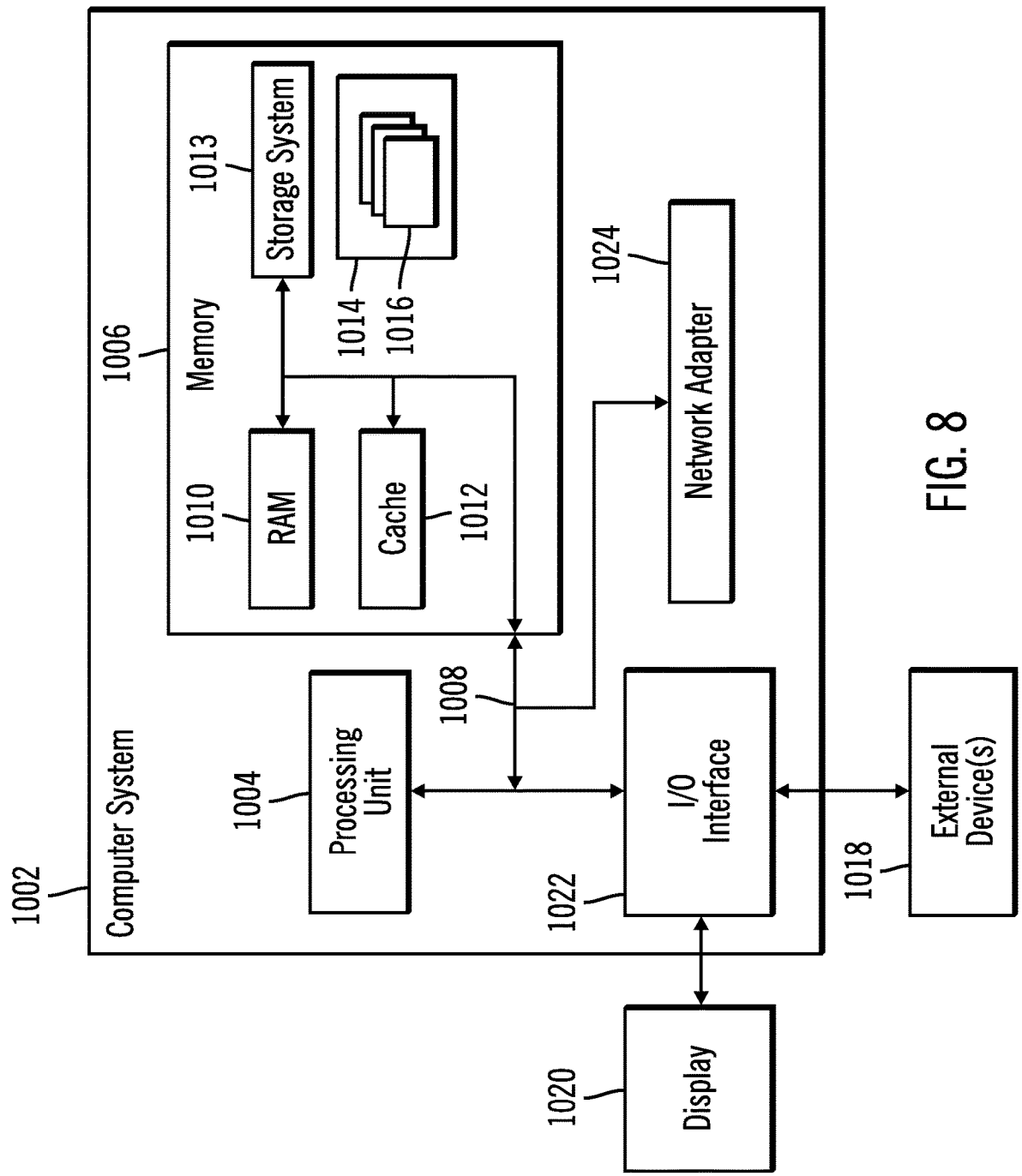
FIG. 8 illustrates a computer embodiment employing multi-mode data replication for data loss risk reduction in accordance with the present description.

The computational components of the figures may each be implemented in one or more computer systems, such as the computer system 1002 shown in FIG. 8. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A system, comprising:
a primary power source;
a backup power source; and
a storage controller including:
   multi-mode data replication logic configured to replicate data in a selected one of a plurality of data replication modes wherein the data replication modes include a first data replication mode and a second data replication mode;
   event detection logic configured to detect a system component event associated with an increase in risk of potential data loss due to a change in online status of a component of the system, including a loss of a primary power source component of the system to define a loss of primary power source event;
   mode identification logic configured to identify a current data replication mode of the multi-mode data replication logic; and
   data replication mode selection logic configured to be responsive to event detection logic to select a data replication mode as a function of a detected system component event, and to be responsive to mode identification logic to, if the current data replication mode is other than the selected data replication mode, initiate a switch of the data replication mode of the multi-mode data replication logic to the selected mode so that the multi-mode data replication logic replicates data in the selected data replication mode if the switch of the multi-mode data replication logic to the selected mode is successful.

2. The system of claim 1 wherein the data replication mode selection logic is further configured to, if the current data replication mode is the selected data replication mode, maintain the multi-mode data replication logic in the current data replication mode.

3. The system of claim 1 wherein the mode identification logic is further configured to detect whether the switch of the multi-mode data replication logic to the selected mode is successful, wherein the first data replication mode is an asynchronous data replication mode, wherein the multi-mode data replication logic is further configured to generate a consistency group in the asynchronous data replication mode, and wherein the second data replication mode is a synchronous data replication mode.

4. The system of claim 3
wherein the data replication mode selection logic is further configured to be responsive to a loss of the primary power source event as detected by event detection logic to select the synchronous data replication mode and, if the current data replication mode is the asynchronous data replication mode, to initiate a switch of data replication mode of the multi-mode data replication logic to the selected synchronous data replication mode so that the multi-mode data replication logic replicates data in the selected synchronous data replication mode if the switch of the multi-mode data replication logic to the selected synchronous data replication mode is successful.

5. The system of claim 4 wherein:
the backup power source has an associated interval of backup time;
the event detection logic is further configured to detect a restoration of the primary power source event prior to expiration of the interval of backup time associated with the backup power source; and
the data replication mode selection logic is further configured to be responsive to a restoration of the primary power source event as detected by event detection logic to select the asynchronous data replication mode and,
if a switch of the multi-mode data replication logic to a selected synchronous data replication mode is successful as detected by the mode identification logic, to initiate a switch of the data replication mode of the multi-mode data replication logic back to the selected asynchronous data replication mode so that the multi-mode data replication logic again replicates data in the selected synchronous data replication mode, and
if a switch of the multi-mode data replication logic to a selected synchronous data replication mode was unsuccessful as detected by the mode identification logic, to resume the data replication mode of the multi-mode data replication logic in the asynchronous data replication mode so that the multi-mode data replication logic replicates data in the asynchronous data replication mode.

6. The system of claim 5 wherein:
the event detection logic is further configured to detect a failure of the primary power source to be restored event prior to expiration of the interval of backup time associated with the backup power source; and
the data replication mode selection logic is further configured to be responsive to a failure of the primary power source to be restored event prior to expiration of the interval of time as detected by event detection logic to:
if a switch of the multi-mode data replication logic to a selected synchronous data replication mode is successful as detected by the mode identification logic, maintain the data replication mode of the multi-mode data replication logic in the selected synchronous data replication mode so that the multi-mode data replication logic replicates data in the selected synchronous data replication mode, and
if a switch of the multi-mode data replication logic to a selected synchronous data replication mode was unsuccessful as detected by the mode identification logic, store a recent consistency group.

7. The system of claim 3 further comprising a system component wherein:
a system component event associated with an increase in risk of potential data loss is an event associated with maintenance of a system component to define a system component maintenance event;
the event detection logic is further configured to detect a system component maintenance event; and
the data replication mode selection logic is further configured to be responsive to a system component maintenance event as detected by event detection logic to select the synchronous data replication mode and, if the current data replication mode is the asynchronous data replication mode, to initiate a switch of the data replication mode of the multi-mode data replication logic to the selected synchronous data replication mode so that the multi-mode data replication logic replicates data in the selected synchronous data replication mode if the switch of the multi-mode data replication logic to the selected synchronous data replication mode is successful.

8. The system of claim 7 wherein:
the event detection logic is further configured to detect whether the maintenance of the system component was successful;
the data replication mode selection logic is further configured to be responsive to the mode identification logic to:
if the switch of the multi-mode data replication logic to the selected synchronous data replication mode is successful as detected by the mode identification logic, maintain the data replication mode of the multi-mode data replication logic in the selected synchronous data replication mode so that the multi-mode data replication logic replicates data in the selected synchronous data replication mode, and is further configured to be responsive to the event detection logic to:
if the maintenance of the system component was successful as detected by the event detection logic, to wait an interval of wait time and upon expiration of the interval of wait time, to switch the data replication mode of the multi-mode data replication logic to the asynchronous data replication mode so that the multi-mode data replication logic replicates data in the asynchronous data replication mode following successful maintenance of the system component, and
if the maintenance of the system component was unsuccessful as detected by the event detection logic, to maintain the data replication mode of the multi-mode data replication logic in the selected synchronous data replication mode so that the multi-mode data replication logic replicates data in the selected synchronous data replication mode; and
if the switch of the multi-mode data replication logic to the selected synchronous data replication mode was unsuccessful as detected by the mode identification logic, to issue a system operator warning that the data replication mode switch failed.

9. A method, comprising:
replicating data in a storage controller in a selected one of a plurality of data replication modes wherein the data replication modes include a first data replication mode and a second data replication mode;
detecting a system component event associated with an increase in risk of potential data loss due to a change in online status of a component of the system, including a loss of a primary power source component of the system to define a loss of primary power source event;
identifying a current data replication mode;
selecting a data replication mode as a function of a detected system component event; and
in response to a current data replication mode identification, if the current data replication mode is other than the selected data replication mode, initiating a switch of the data replication mode to the selected mode so that data is replicated in the selected data replication mode if the switch to the selected mode is successful.

10. The method of claim 9 further comprising in response to a current data replication mode identification, if the current data replication mode is the selected data replication mode, maintaining the current data replication mode.

11. The method of claim 9 wherein the first data replication mode is an asynchronous data replication mode and the second data replication mode is a synchronous data replication mode, the method further comprising generating a consistency group in the asynchronous data replication mode, and detecting whether the switch to the selected mode is successful.

12. The method of claim 11 wherein the selecting includes in response to a loss of primary power source event detection, selecting the synchronous data replication mode, and the switch initiating includes if the current data replication mode is the asynchronous data replication mode, initiating a switch of data replication mode to the selected synchronous data replication mode so that data is replicated in the selected synchronous data replication mode if the switch to the selected synchronous data replication mode is successful.

13. The method of claim 12 wherein the detecting further includes detecting a primary power source restoration event prior to expiration of an interval of backup time associated with a backup power source, the selecting further includes in response to a primary power source restoration event detection, selecting the asynchronous data replication mode, and the switch initiating further includes if a switch to a selected synchronous data replication mode is successful, initiating switching of the data replication mode back to the selected asynchronous data replication mode so that data is replicated in the selected asynchronous data replication mode, the method further comprising if a switch to a selected synchronous data replication mode was unsuccessful, resuming the data replication mode in the asynchronous data replication mode so that data is replicated in the asynchronous data replication mode.

14. The method of claim 13 wherein the detecting further includes detecting a primary power source restoration failure event prior to expiration of the interval of backup time associated with a backup power source, the method further comprising in response to detection of a primary power source restoration failure event in which a primary power source failed to be restored prior to expiration of the interval of backup time associated with a backup power source:
if a switch to a selected synchronous data replication mode was successful, maintaining the data replication mode in the selected synchronous data replication mode so that data is replicated in the selected synchronous data replication mode prior to a swap of input/output operations to a remote system, and
if a switch to a selected synchronous data replication mode was unsuccessful, storing data supporting a recent consistency group prior to a shutdown of a system following expiration of the interval of backup time.

15. The method of claim 12 further comprising if the switch to the selected synchronous data replication mode is successful, maintaining the data replication mode in the selected synchronous data replication mode so data is replicated in the selected synchronous data replication mode while the system component is undergoing maintenance and wherein the detecting further includes detecting a successful maintenance event associated with successful maintenance of the system component,
wherein the method further comprises in response to detection of a successful maintenance event, waiting an interval of wait time and wherein the switch initiating further includes upon expiration of the interval of wait time, initiating switching of the data replication mode to the asynchronous data replication mode so that data is replicated in the asynchronous data replication mode following successful maintenance of the system component, and
wherein the method further comprises in absence of detection of a successful maintenance event, maintaining the data replication mode in the selected synchronous data replication mode so that data is replicated in the selected synchronous data replication mode until one of 1) detection of a successful maintenance event, and 2) a manual switch of the data replication mode to an asynchronous data replication mode, and if the switch to the selected synchronous data replication mode was unsuccessful, issuing a system operator warning that the data replication mode switch failed.

16. The method of claim 11 wherein a system component event associated with an increase in risk of potential data loss includes an event associated with maintenance of a system component to define a system component maintenance event, wherein the detecting includes detecting a system component maintenance event, the selecting includes in response to detection of a system component maintenance event, selecting the synchronous data replication mode and, the switch initiating includes if the current data replication mode is the asynchronous data replication mode, initiating a switch of the data replication mode to the selected synchronous data replication mode so that data is replicated in the selected synchronous data replication mode if the switch to the selected synchronous data replication mode is successful.

17. A computer program product for use in a computer system having a primary system including system components and a storage controller which includes a processor, and a remote system, wherein the computer program product comprises a computer readable storage medium having program instructions embodied therewith, the program instructions executable by a processor of the computer system to cause processor operations, the processor operations comprising:
replicating data in a storage controller in a selected one of a plurality of data replication modes wherein the data replication modes include a first data replication mode and a second data replication mode;
detecting a system component event associated with an increase in risk of potential data loss due to a change in online status of a component of the system, including a loss of a primary power source component of the system to define a loss of primary power source event;
identifying a current data replication mode;

selecting a data replication mode as a function of a detected system component event; and in response to a current data replication mode identification, if the current data replication mode is other than the selected data replication mode, initiating a switch of the data replication mode to the selected mode so that data is replicated in the selected data replication mode if the switch to the selected mode is successful.

18. The computer program product of claim 17 wherein the operations further comprise in response to a current data replication mode identification, if the current data replication mode is the selected data replication mode, maintaining the current data replication mode.

19. The computer program product of claim 17 wherein the first data replication mode is an asynchronous data replication mode and the second data replication mode is a synchronous data replication mode, and wherein the operations further comprise generating a consistency group in the asynchronous data replication mode, and detecting whether the switch to the selected mode is successful.

20. The computer program product of claim 19 the selecting includes in response to a loss of primary power source event detection, selecting the synchronous data replication mode, and the switch initiating includes if the current data replication mode is the asynchronous data replication mode, initiating a switch of data replication mode to the selected synchronous data replication mode so that data is replicated in the selected synchronous data replication mode if the switch to the selected synchronous data replication mode is successful.

21. The computer program product of claim 20 wherein the detecting further includes detecting a primary power source restoration event prior to expiration of an interval of backup time associated with a backup power source, the selecting further includes in response to a primary power source restoration event detection, selecting the asynchronous data replication mode, and the switch initiating further includes if a switch to a selected synchronous data replication mode is successful, initiating switching of the data replication mode back to the selected asynchronous data replication mode so that data is replicated in the selected asynchronous data replication mode, wherein the operations further comprise if a switch to a selected synchronous data replication mode was unsuccessful, resuming the data replication mode in the asynchronous data replication mode so that data is replicated in the asynchronous data replication mode.

22. The computer program product of claim 21 wherein the detecting further includes detecting a primary power source restoration failure event prior to expiration of the interval of backup time associated with a backup power source, wherein the operations further comprise in response to detection of a primary power source restoration failure event in which a primary power source failed to be restored prior to expiration of the interval of backup time associated with a backup power source:

if a switch to a selected synchronous data replication mode was successful, maintaining the data replication mode in the selected synchronous data replication mode so that data is replicated in the selected synchronous data replication mode prior to a swap of input/output operations to a remote system, and if a switch to a selected synchronous data replication mode was unsuccessful, storing data supporting a recent consistency group prior to a shutdown of a system following expiration of the interval of backup time.

23. The computer program product of claim 20 wherein the operations further comprise if the switch to the selected synchronous data replication mode is successful, maintaining the data replication mode in the selected synchronous data replication mode so data is replicated in the selected synchronous data replication mode while the system component is undergoing maintenance and wherein the detecting further includes detecting a successful maintenance event associated with successful maintenance of the system component, wherein the operations further comprise in response to detection of a successful maintenance event, waiting an interval of wait time and wherein the switch initiating further includes upon expiration of the interval of wait time, initiating switching of the data replication mode to the asynchronous data replication mode so that data is replicated in the asynchronous data replication mode following successful maintenance of the system component, and wherein the operations further comprise in absence of detection of a successful maintenance event, maintaining the data replication mode in the selected synchronous data replication mode so that data is replicated in the selected synchronous data replication mode until one of 1) detection of a successful maintenance event, and 2) a manual switch of the data replication mode to an asynchronous data replication mode, and if the switch to the selected synchronous data replication mode was unsuccessful, issuing a system operator warning that the data replication mode switch failed.

24. The computer program product of claim 19 wherein a system component event associated with an increase in risk of potential data loss includes an event associated with maintenance of a system component to define a system component maintenance event, wherein the detecting includes detecting a system component maintenance event, the selecting includes in response to detection of a system component maintenance event, selecting the synchronous data replication mode and, the switch initiating includes if the current data replication mode is the asynchronous data replication mode, initiating a switch of the data replication mode to the selected synchronous data replication mode so that data is replicated in the selected synchronous data replication mode if the switch to the selected synchronous data replication mode is successful.

* * * * *